Figure 1:
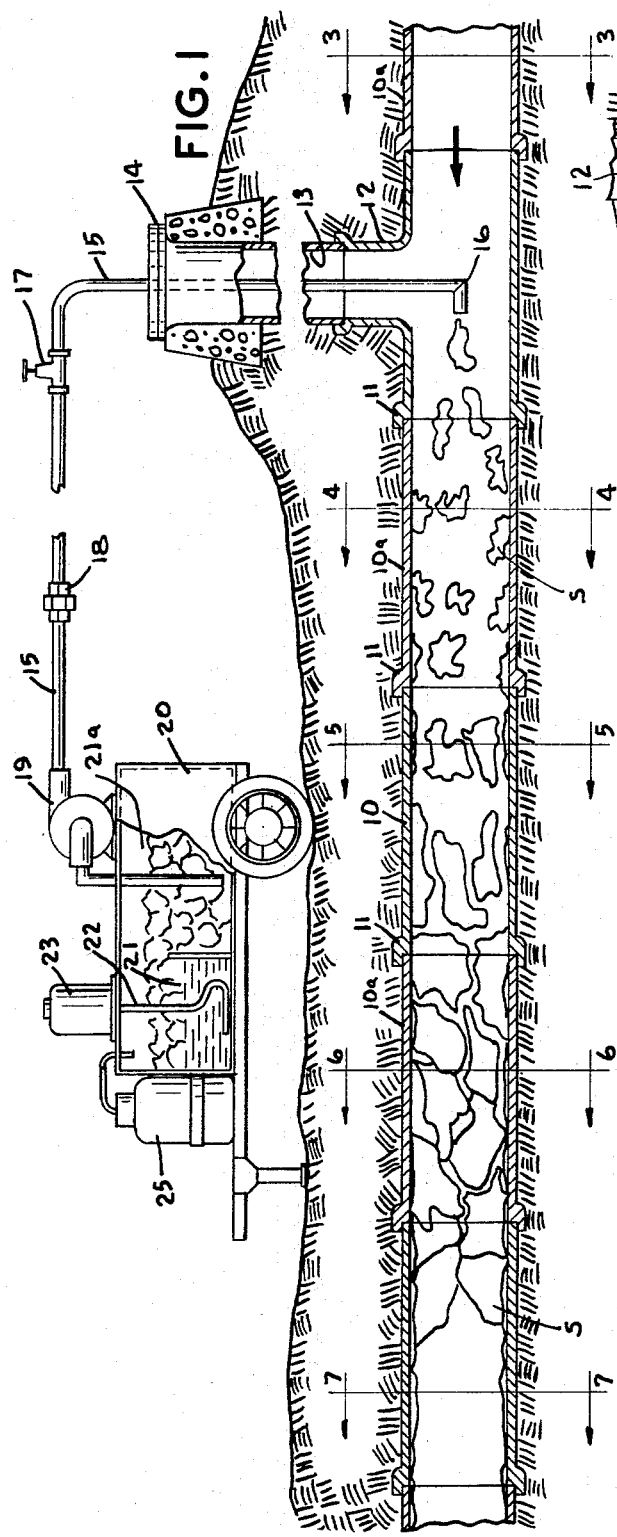

Nov. 22, 1966   E. O. HILBUSH, JR   3,287,148
METHOD FOR SEALING GAS MAINS
Filed March 1, 1963   2 Sheets-Sheet 1

INVENTOR.
EDWARD O. HILBUSH JR.
BY

Nov. 22, 1966  E. O. HILBUSH, JR  3,287,148
METHOD FOR SEALING GAS MAINS
Filed March 1, 1963  2 Sheets-Sheet 2

INVENTOR.
EDWARD O. HILBUSH JR.
BY
*Hyde W. Ballard*

United States Patent Office 3,287,148
Patented Nov. 22, 1966

3,287,148
METHOD FOR SEALING GAS MAINS
Edward O. Hilbush, Jr., West Chester, Pa., assignor to West Chester Chemical Company, Inc., a corporation of Pennsylvania
Filed Mar. 1, 1963, Ser. No. 262,065
10 Claims. (Cl. 117—2)

This invention relates to method and apparatus for sealing leaks in underground conduits and particularly to a method for introducing a foamed sealant into an underground gas main.

With the advent of different types of illuminating gas now being supplied in gas mains and the concurrent use of higher pressures, it has been found that the mains as originally installed are subject to serious problems of leakage. In addition there is, of course, the normal leakage that may occur due to the settling of earth formations, damage caused by underground growth of vegetation such as tree roots, etc., etc.

It is an extremely costly operation to dig up and relay these gas mains, plus the fact that the public is greatly inconvenienced because of the incident loss of fuel, as well as the blocking of streets and highways to vehicular and pedestrian traffic.

Various proposals have been made in the past for sealing such gas mains, but none has met with unqualified success. The present invention contemplates the use of a foam as a vehicle to carry the sealant into and through the gas main without in any way interrupting the normal use of the gas main and providing a minimum of surface operation.

The present invention contemplates the introduction of a sealant at suitable locations in a gas main conduit in which means for foaming the sealant are provided closely adjacent to the point at which the foamed sealant is introduced to the main. The point or points of foam introduction may be selected in accordance with conditions; i.e., foam may be introduced at one end of a main so that it may be carried for considerable distance therethrough along with the normal flow of gas.

Alternatively, where a particular section of the main is known to be leaking, the foam may be introduced at points closely adjacent to or at the leak. Such leaks usually occur at the bell joints of the gas main pipe sections, but this is not necessarily the case.

The foam as prepared in accordance with the present invention, will eventually separate into a gas and the liquid sealant. Excess liquid sealant may be removed from the gas main as will be described more fully hereinafter, but as long as the sealant remains in the foam state there is a definite tendency for the foam to migrate towards the leaks.

It is customary in many urban installations to provide a definite slope in the gas main so that any condensation or other liquids within the main will have a natural flow to a point where they can be removed. Such points are known as drip pots, and consist of a trap located at the low point in a length of gas main which has a pipe or conduit running vertically away from the bottom of the trap to an accessible location on the surface. These traps can then be periodically emptied by pumping out liquid until a flow of gas occurs.

In such situations I propose to drill and tap the gas main in a high point between two drip pots, for example, whereupon the foamed sealant may be introduced at the high point in the gas main and any excess liquid sealant will eventually find its way to one or more of the drip pots on either side of the point of introduction. This excess sealant may then be removed in the manner described above.

The primary object of the invention, therefore, is to provide a method for sealing underground conduits and the like by introducing a foamed material into the gas main.

A further object of the invention is to provide a method for sealing underground gas mains and the like by introducing a foamed sealant into the main and distributing the sealant throughout a predetermined length of the main by means of the normal flow of gas therethrough.

A further object of the invention is to provide apparatus for introducing foamed sealant into an underground conduit.

A further object of the invention is to provide an improved foamed sealant suitable for use in fluid carrying conduits.

Further objects will be apparent from the specification and drawings in which

Figure 2:
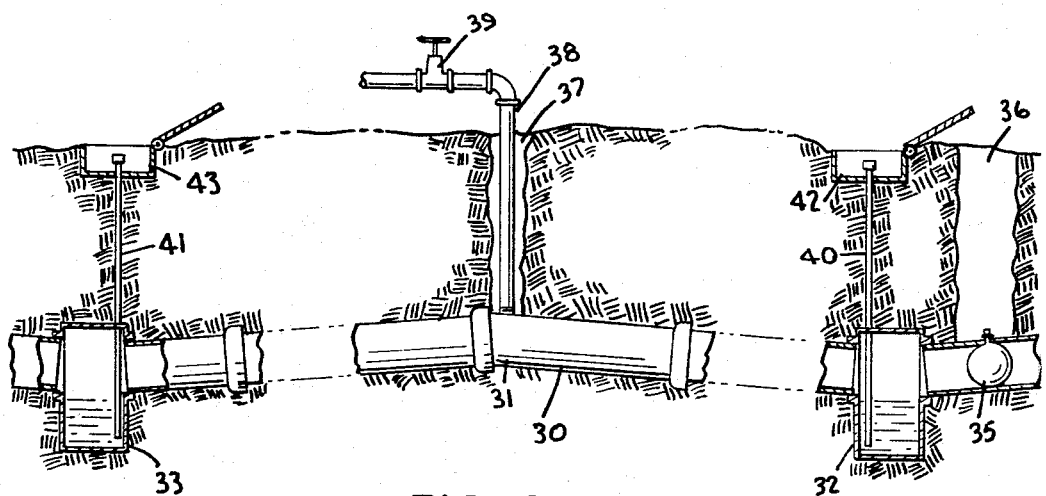
Figure 8:
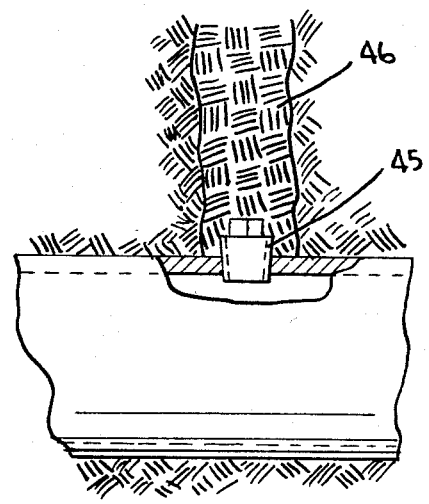

FIG. 1 is a schematic view showing my improved foaming apparatus supplying a foamed sealant to an underground conduit through a manhole or similar pre-installed opening in the conduit, FIG. 2 is a schematic view showing the manner for introducing a foamed sealant to an underground conduit having a slope and one or more drip pots, FIG. 3 is a section as seen at 3—3 of FIG. 1,
FIG. 4 is a section as seen at 4—4 of FIG. 1,
FIG. 5 is a section as seen at 5—5 of FIG. 1,
FIG. 6 is a section as seen at 6—6 of FIG. 1,
FIG. 7 is a section as seen at 7—7 of FIG. 1, and
FIG. 8 is an enlarged sectional detail showing a blocked gas main after the introduction of a sealant by the method of FIG. 2.

Referring now more particularly to the drawings, an underground conduit 10 is shown having a series of individual sections or pipes 10a, 10a connected to each other by means of the usual bell joints 11, 11. One of the sections 12 has an upwardly extending passage 13 through which access to the main is accomplished by means of a cap or cover 14. For the purpose of introducing a sealant within the bore of conduit 10, I propose to introduce a pipe 15 through cap 14 and passage 13 which terminates in a pitot shown generally at 16.

The flow of gas through conduit 10 will, of course, in this case be in the direction of the arrow. Pipe 15 is provided with a valve 17 and a union or coupling 18 through which it is connected to a blower or other convenient pump 19 on a foaming machine 20. The liquid sealant is introduced into a separated tank or reservoir 21 where it is subjected to violent agitation by a blade or beater 22 driven from motor 23. The foamed material expands into chamber 21a, and thence is delivered under pressure to pipe 15, such pressure being slightly in excess of the pressure in the conduit 10. In the case of illuminating gas it is of importance that the foaming gas be compatible with the type of gas in the main. For example, it would be impractical to use air as a foaming agent. Therefore, I utilize a separate source of gas from tank 25 which may be propane or a similar type of combustible gas that is satisfactory for introduction into the main. Alternatively, a bleeder from the main could be installed in the independent tank 25.

As the foamed sealant is discharged directionally into the main it is carried downstream by the flow of gas in the main and dispersed substantially over the entire bore of the conduit 10. FIG. 4 shows the foam more or less evenly distributed inside conduit 10, whereas FIGS. 5 to 7 indicate the manner in which the liquid sealant gradually condenses and flows completely around the inside of the bore of the conduit. During this operation the gaseous vehicle such as propane will become liberated from the foam and flow through the conduit, whereas, the liquid sealant will collect to form a coating on the inside of the bore of the conduit. Where a leak is present there will be a tendency for the sealant to accumulate in greater quantity.

Depending upon the particular type of conduit to be sealed, the treatment shown in FIG. 1 may be adequate if access can be obtained to an area closely adjacent a known leak. The amount of foam introduced, therefore can be minimal so that there will be no substantial contamination or liquid runout causing harmful effects in the main. It will be understood, of course, that the service takeoffs in a gas main are from the top of the conduit. Unless excessive amounts of the foamed sealant are introduced at a point closely adjacent such service takeoffs, there would be little likelihood that the foam would pass through such takeoff.

Where, however, the conditions indicate that great amounts of sealant must be introduced as in the case of installations having several hundred feet between drip pots from which liquid is extracted from the main I propose to use the method shown in FIG. 2. In this case a length of underground conduit such as a gas main 30 is shown sloped from an apex at 31 in opposite directions to drip pots 32 and 33. The slope of the gas main has been somewhat exaggerated in FIG. 2 because the slope actually extends for a distance of one or two normal city blocks. In this case I propose to introduce a "bagoff" 35 on the opposite side of either or both drip pots 32 and 33. The bagoff 35 is a flexible, inflatable bulkhead introduced into the main 30 by excavating at 36 and drilling a small hole in the top of the main. The deflated bagoff or bulkhead is inserted into the main through the drilled hole whereupon it may be inflated to completely seal off the main at this point. A second excavation 37 is made above the apex 31 of the conduit. The conduit is then drilled and tapped at the apex to accept a pipe 38 provided with a purging valve 39 that can be used to remove any air in the pipe 38 prior to connection to the foaming apparatus 20. Likewise, if desired, the valve 39 can be opened to back purge the entire foaming apparatus, and it will be also understood that depending upon the pressure needed, the blower or pump 19 may be bypassed if conditions so warrant.

When the foaming apparatus 20 is properly connected and purged, the foamed sealant is introduced to conduit 30 through pipe 38 in much the same manner as shown in FIG. 1. In this case, however, no pitot is employed so that foam travels in opposite directions because the normal flow of gas in the main has been temporarily shut off due to the pressure of the bulkhead 35. Under these conditions substantial amounts of foam may be introduced so that after the foam bubbles have been broken and the excess liquid sealant drained into the drip pots 32 and 33 a satisfactory sealing coating has been provided throughout the bore of the conduit 30 between the drip pots. The sealant or other liquid which has collected in the drip pots 32 and 33 may be removed through vertical pipes 40 and 41 which terminate in manholes 42 and 43 respectively. When a suitable time interval has elapsed for proper hardening or coagulation of the sealant in the conduit the bulkhead 35 is deflated and removed and both of the holes that have been bored in the conduit may be plugged with a suitable plug 45 (FIG. 8), whereupon the excavations are refilled as shown at 46.

The method and apparatus of the invention may be used under varying conditions, both with and without interrupting the flow of gas in the conduit. The particular method employed depends, of course, on the nature of the leaks to be sealed and other conditions present at any given time and location. In the drawings foamed sealant has been designated by the letter S.

I have found that a satisfactory foaming material for introduction into gas mains and the like comprises a foamed material of 200 parts by volume of an acrylic emulsion prepared by the polymerization of one or more acrylic monomers in water as sold on the market under the trade name of B60A Acrosol; 12 parts water; 2 parts of an anionic wetting agent of the type sold on the market under the name of Triton X200; and 8 parts of 12½% ammonia. The above ingredients are foamed by a whipping action of the agitator starting at approximately 900 r.p.m. and gradually increasing in speed to approximately 3600 r.p.m. After foaming, a stabilizer may be added, such stabilizer consisting of 4 parts by volume of an acid containing an acrylic emulsion copolymer of the type sold under the trade name of ASE Acrosol, and 8 parts of water. The foam prepared as described above contains completely uniform regular globules or bubbles which at a magnification of 46× are between ⅛" and 3/16" in diameter.

In addition to the acrylic type sealant described above, a latex type sealant has been used with satisfactory results. This may take the form of polychloroprene cationic latex. Also an epoxy resin formed emulsion may be used, in fact any satisfactory liquid sealant capable of being foamed and retained in a stabilized foamed condition for a long enough period to permit introduction to the point of leakage will be satisfactory for use in the present invention.

Having thus described my invention,

I claim:

1. The method of sealing leaks in conduits for gas without removing same from service which comprises the steps of foaming a liquid sealant compatible with the gas passing through said conduit and capable of being condensed to form a sealing film, introducing said foamed sealant to the bore of a conduit without removing said conduit from service, and directing the foamed sealant in the direction of flow of the gas in said conduit to an area of leakage in the conduit whereby the foamed sealant condenses to form a seal on the inner surface of said conduit in the leakage area.

2. The method of claim 1 in which the sealant is foamed with a flammable gas.

3. The method of claim 1 in which the sealant is foamed with propane.

4. The method of claim 1 in which the sealant is foamed with illuminating gas.

5. The method of claim 1 in which the sealant is an acrylic resin.

6. The method of claim 1 in which the sealant is an elastomeric latex.

7. The method of claim 1 in which the sealant is an epoxy resin.

8. The method of sealing leaks in underground gas mains without removing the main from service which comprises introducing a pipe into a relatively high portion of the main, propelling a foamed liquid sealant compatible with the gas and capable of being condensed to form a sealing film through said pipe under pressure, directing the foamed sealant in opposite directions through the conduit without removing the main from service whereby the foamed sealant condenses to form a seal on the inner surface of said main in the leakage area, and collecting any excess condensed liquid sealant from spaced points in the conduit.

9. The method of sealing leaks in an underground gas main without removing the main from service which comprises the steps of foaming a liquid sealant compatible with the gas and capable of being condensed to form a sealing film at a point adjacent the gas main area to be sealed, delivering the foamed sealant under pressure into the gas main without removing the main from service, and flowing the foamed sealant to leakage points by means of the gas in the main whereby the foamed sealant condenses to form a seal on the inner surface of the main in the leakage area.

10. The method of sealing leaks in an underground gas main without removing the main from service which comprises the steps of foaming a liquid sealant compatible with the gas and capable of being condensed to form a sealing film at a point adjacent the gas main area to be sealed, delivering the foamed sealant under pressure through a discharge pipe and into the gas main in the direction of gas travel in the main without removing the main from service, and flowing the foamed sealant to leakage points by means of the gas in the main whereby the foamed sealant condenses to form a seal on the inner surface of the main at the leakage point.

References Cited by the Examiner

UNITED STATES PATENTS

| | | | |
|---|---|---|---|
| 2,950,702 | 8/1960 | Ferguson et al. | 117—95 |
| 3,108,012 | 10/1963 | Curtis | 117—95 |

OTHER REFERENCES

Toohy; "Low Density Rigid Epoxy Foams," Chemical Engineering Process, vol. 57, No. 10, October 1961 (pp. 52–54 relied upon).

"Making Mines Safer," Modern Plastics, August 1962, (pp. 94 and 183 relied upon).

WILLIAM D. MARTIN, *Primary Examiner.*

S. W. ROTHSTEIN, *Assistant Examiner.*